US006788335B2

(12) United States Patent
Young, Jr. et al.

(10) Patent No.: US 6,788,335 B2
(45) Date of Patent: Sep. 7, 2004

(54) PULSED ILLUMINATION SIGNAL MODULATION CONTROL & ADJUSTMENT METHOD AND SYSTEM

(75) Inventors: Robert S. Young, Jr., Austin, TX (US); Marc C. Digby, Austin, TX (US); Christopher P. Hansen, Indianapolis, IN (US); Clyde W. Hinkle, II, Austin, TX (US); Jon Isom, Austin, TX (US); G. Gregory Mooty, Austin, TX (US)

(73) Assignee: Eastman Kodak Company, Rochester, NY (US)

( * ) Notice: Subject to any disclaimer, the term of this patent is extended or adjusted under 35 U.S.C. 154(b) by 443 days.

(21) Appl. No.: 09/746,859

(22) Filed: Dec. 21, 2000

(65) Prior Publication Data

US 2001/0030686 A1 Oct. 18, 2001

Related U.S. Application Data

(60) Provisional application No. 60/173,781, filed on Dec. 30, 1999, provisional application No. 60/174,074, filed on Dec. 30, 1999, provisional application No. 60/173,787, filed on Dec. 30, 1999, provisional application No. 60/174,073, filed on Dec. 30, 1999, and provisional application No. 60/173,780, filed on Dec. 30, 1999.

(51) Int. Cl.[7] .............................................. H04N 7/18
(52) U.S. Cl. ................................. 348/96; 348/97
(58) Field of Search .................... 348/96–112

(56) References Cited

U.S. PATENT DOCUMENTS

| | | | |
|---|---|---|---|
| 2,404,138 A | 7/1946 | Mayer | 95/94 |
| 3,520,689 A | 7/1970 | Nagae et al. | 96/55 |
| 3,520,690 A | 7/1970 | Nagae et al. | 96/55 |
| 3,587,435 A | 6/1971 | Chioffe | 95/93 |
| 3,615,479 A | 10/1971 | Kohler et al. | 96/48 |
| 3,615,498 A | 10/1971 | Aral et al. | 96/55 |
| 3,617,282 A | 11/1971 | Bard et al. | 96/59 |
| 3,747,120 A | 7/1973 | Stemme | 346/75 |
| 3,833,161 A | 9/1974 | Krumbein | 226/92 |
| 3,903,541 A | 9/1975 | Von Meister et al. | 354/317 |
| 3,946,398 A | 3/1976 | Kyser et al. | 346/1 |

(List continued on next page.)

FOREIGN PATENT DOCUMENTS

| | | | | |
|---|---|---|---|---|
| EP | 0 261 782 A2 | 8/1987 | | H04N/1/46 |
| EP | 0 422 220 A1 | 3/1989 | | A61B/6/03 |
| EP | 0 482 790 B1 | 9/1991 | | H04N/1/40 |

(List continued on next page.)

OTHER PUBLICATIONS

"*Adaptive Fourier Threshold Filtering: A Method to Reduce Noise and Incoherent Artifacts in High Resolution Cardiac Images*", Doyle, M., et al., 8306 Magnetic Resonance in Medicine 31, No. 5, Baltimore, MD, May, 1994, pp. 546–550.

(List continued on next page.)

*Primary Examiner*—Andy Rao
(74) *Attorney, Agent, or Firm*—Baker Botts; David A. Novais (57) ABSTRACT

One aspect of the invention is a method for signal modulation adjustment. The method comprises illuminating a reference target and a region of film with a first light source for a first time interval. The method further comprises capturing image data from the film in response to a first amount of light reflected from the film with a first sensor for a first integration time. The method also comprises approximately simultaneously producing a first reference output in response to a first amount of light reflected from the reference target in a field of view of a reference sensor. More particularly, the method further comprises adjusting the data in response to the reference output. In a further embodiment, the method comprises adjusting an output illumination level of the first light source in response to the first reference output before a next time interval.

10 Claims, 7 Drawing Sheets

U.S. PATENT DOCUMENTS

| | | | |
|---|---|---|---|
| 3,959,048 A | 5/1976 | Stanfield et al. | 156/94 |
| 4,026,756 A | 5/1977 | Stanfield et al. | 156/554 |
| 4,081,577 A | 3/1978 | Horner | 427/424 |
| 4,142,107 A | 2/1979 | Hatzakis et al. | 250/571 |
| 4,215,927 A | 8/1980 | Grant et al. | 354/317 |
| 4,249,985 A | 2/1981 | Stanfield | 156/554 |
| 4,265,545 A | 5/1981 | Slaker | 356/431 |
| 4,301,469 A | 11/1981 | Modeen et al. | 358/75 |
| 4,490,729 A | 12/1984 | Clark et al. | 346/75 |
| 4,501,480 A | 2/1985 | Matsui et al. | 354/298 |
| 4,564,280 A | 1/1986 | Fukuda | 354/317 |
| 4,594,598 A | 6/1986 | Iwagami | 346/140 |
| 4,621,037 A | 11/1986 | Kanda et al. | 430/30 |
| 4,623,236 A | 11/1986 | Stella | 354/318 |
| 4,633,300 A | 12/1986 | Sakai | 358/41 |
| 4,636,808 A | 1/1987 | Herron | 346/75 |
| 4,666,307 A | 5/1987 | Matsumoto et al. | 356/404 |
| 4,670,779 A | 6/1987 | Nagano | 358/75 |
| 4,688,099 A * | 8/1987 | Funston | 348/96 |
| 4,736,221 A | 4/1988 | Shidara | 354/317 |
| 4,741,621 A | 5/1988 | Taft et al. | 356/376 |
| 4,745,040 A | 5/1988 | Levine | 430/21 |
| 4,755,844 A | 7/1988 | Tsuchiya et al. | 354/317 |
| 4,777,102 A | 10/1988 | Levine | 430/21 |
| 4,796,061 A | 1/1989 | Ikeda et al. | 355/73 |
| 4,814,630 A | 3/1989 | Lim | 250/578 |
| 4,821,114 A | 4/1989 | Gebhardt | 358/75 |
| 4,845,551 A | 7/1989 | Matsumoto | 358/80 |
| 4,851,311 A | 7/1989 | Millis et al. | 430/30 |
| 4,857,430 A | 8/1989 | Millis et al. | 430/30 |
| 4,875,067 A | 10/1989 | Kanzaki et al. | 354/325 |
| 4,969,045 A | 11/1990 | Haruki et al. | 358/228 |
| 4,994,918 A | 2/1991 | Lingemann | 358/214 |
| 5,027,146 A | 6/1991 | Manico et al. | 354/299 |
| 5,034,767 A | 7/1991 | Netz et al. | 354/317 |
| 5,101,286 A | 3/1992 | Patton | 358/487 |
| 5,124,216 A | 6/1992 | Giapis et al. | 430/30 |
| 5,155,596 A | 10/1992 | Kurtz et al. | 358/214 |
| 5,196,285 A | 3/1993 | Thomson | 430/30 |
| 5,200,817 A | 4/1993 | Birnbaum | 358/80 |
| 5,212,512 A | 5/1993 | Shiota | 354/319 |
| 5,231,439 A | 7/1993 | Takahashi et al. | 354/313 |
| 5,235,352 A | 8/1993 | Pies et al. | 346/140 |
| 5,255,408 A | 10/1993 | Blackman | 15/308 |
| 5,266,805 A | 11/1993 | Edgar | 250/330 |
| 5,267,030 A | 11/1993 | Giorgianni et al. | 358/527 |
| 5,292,605 A | 3/1994 | Thomson | 430/30 |
| 5,296,923 A | 3/1994 | Hung | 358/527 |
| 5,334,247 A | 8/1994 | Columbus et al. | 118/411 |
| 5,350,651 A | 9/1994 | Evans et al. | 430/21 |
| 5,350,664 A | 9/1994 | Simons | 430/362 |
| 5,357,307 A | 10/1994 | Glanville et al. | 354/324 |
| 5,360,701 A | 11/1994 | Elton et al. | 430/501 |
| 5,371,542 A | 12/1994 | Pauli et al. | 348/262 |
| 5,391,443 A | 2/1995 | Simons et al. | 430/21 |
| 5,414,779 A | 5/1995 | Mitch | 382/199 |
| 5,416,550 A | 5/1995 | Skye et al. | 354/298 |
| 5,418,119 A | 5/1995 | Simons | 430/507 |
| 5,418,597 A | 5/1995 | Lahcanski et al. | 355/76 |
| 5,432,579 A | 7/1995 | Tokuda | 354/293 |
| 5,436,738 A | 7/1995 | Manico | 358/503 |
| 5,440,365 A | 8/1995 | Gates et al. | 354/298 |
| 5,447,811 A | 9/1995 | Buhr et al. | 430/20 |
| 5,448,380 A | 9/1995 | Park | 357/520 |
| 5,452,018 A | 9/1995 | Capitant et al. | 348/651 |
| 5,465,155 A | 11/1995 | Edgar | 358/500 |
| 5,477,345 A | 12/1995 | Tse | 358/500 |
| 5,496,669 A | 3/1996 | Pforr et al. | 430/22 |
| 5,516,608 A | 5/1996 | Hobbs et al. | 430/30 |
| 5,519,510 A | 5/1996 | Edgar | 358/471 |
| 5,528,288 A * | 6/1996 | Sandor et al. | 348/97 |
| 5,546,477 A | 8/1996 | Knowles et al. | 382/242 |
| 5,550,566 A | 8/1996 | Hodgson et al. | 345/202 |
| 5,552,904 A | 9/1996 | Ryoo et al. | 358/518 |
| 5,563,717 A | 10/1996 | Koeng et al. | 358/406 |
| 5,568,270 A | 10/1996 | Endo | 358/298 |
| 5,576,836 A | 11/1996 | Sano et al. | 358/302 |
| 5,581,376 A | 12/1996 | Harrington | 358/518 |
| 5,587,752 A | 12/1996 | Petruchik | 396/315 |
| 5,596,415 A | 1/1997 | Cosgrove et al. | 358/296 |
| 5,627,016 A | 5/1997 | Manico | 430/434 |
| 5,649,260 A | 7/1997 | Wheeler et al. | 396/569 |
| 5,664,253 A | 9/1997 | Meyers | 396/603 |
| 5,664,255 A | 9/1997 | Wen | 396/627 |
| 5,667,944 A | 9/1997 | Reem et al. | 430/359 |
| 5,678,116 A | 10/1997 | Sugimoto et al. | 396/611 |
| 5,691,118 A | 11/1997 | Haye | 430/357 |
| 5,695,914 A | 12/1997 | Simon et al. | 430/379 |
| 5,698,382 A | 12/1997 | Nakahanada et al. | 430/418 |
| 5,726,773 A | 3/1998 | Mehlo et al. | 358/474 |
| 5,739,897 A | 4/1998 | Frick et al. | 355/40 |
| 5,771,107 A | 6/1998 | Fujimoto et al. | 358/464 |
| 5,784,529 A * | 7/1998 | Richmond | 386/128 |
| 5,790,277 A | 8/1998 | Edgar | 358/487 |
| 5,835,795 A | 11/1998 | Craig et al. | 396/6 |
| 5,835,811 A | 11/1998 | Tsumura | 396/598 |
| 5,870,172 A | 2/1999 | Blume | 355/27 |
| 5,880,819 A | 3/1999 | Tanaka et al. | 355/75 |
| 5,892,595 A | 4/1999 | Yamakawa et al. | 358/530 |
| 5,930,388 A | 7/1999 | Murakami et al. | 382/167 |
| 5,959,720 A | 9/1999 | Kwon et al. | 355/38 |
| 5,963,662 A | 10/1999 | Vachtsevanos et al. | 382/150 |
| 5,966,465 A | 10/1999 | Keith et al. | 382/232 |
| 5,979,011 A | 11/1999 | Miyawaki et al. | 15/308 |
| 5,982,427 A * | 11/1999 | Hunt et al. | 348/254 |
| 5,982,936 A | 11/1999 | Tucker et al. | 382/233 |
| 5,982,937 A | 11/1999 | Accad | 382/239 |
| 5,982,941 A | 11/1999 | Loveridge et al. | 382/260 |
| 5,982,951 A | 11/1999 | Katayama et al. | 382/284 |
| 5,988,896 A | 11/1999 | Edgar | 396/604 |
| 5,991,444 A | 11/1999 | Burt et al. | 382/232 |
| 5,998,109 A | 12/1999 | Hirabayashi | 430/434 |
| 6,000,284 A | 12/1999 | Shin et al. | 73/150 |
| 6,005,987 A | 12/1999 | Nakamura et al. | 382/294 |
| 6,034,719 A * | 3/2000 | Tazawa et al. | 348/96 |
| 6,065,824 A | 5/2000 | Bullock et al. | 347/19 |
| 6,069,714 A | 5/2000 | Edgar | 358/487 |
| 6,088,084 A | 7/2000 | Nishio | 355/75 |
| 6,089,687 A | 7/2000 | Helterline | 347/7 |
| 6,101,273 A | 8/2000 | Matama | 382/169 |
| 6,102,508 A | 8/2000 | Cowger | 347/7 |
| 6,137,965 A | 10/2000 | Burgeios et al. | 396/626 |
| 6,200,738 B1 | 3/2001 | Takano et al. | 430/362 |
| 6,542,179 B1 * | 4/2003 | Kurtz et al. | 348/97 |

FOREIGN PATENT DOCUMENTS

| | | | |
|---|---|---|---|
| EP | 0 525 886 A3 | 7/1992 | G03D/5/00 |
| EP | 0 580 293 A1 | 6/1993 | H04N/1/04 |
| EP | 0 580 293 A1 | 1/1994 | H04N/1/04 |
| EP | 0 601 364 A1 | 6/1994 | H04N/1/387 |
| EP | 0 669 753 A2 | 2/1995 | H04N/1/407 |
| EP | 0 768 571 A2 | 4/1997 | G03D/13/00 |
| EP | 0 794 454 A2 | 9/1997 | G03B/27/73 |
| EP | 0 806 861 A1 | 11/1997 | H04N/1/00 |
| EP | 0 878 777 A2 | 11/1998 | G06T/5/40 |
| EP | 0 930 498 A2 | 7/1999 | G01N/21/88 |
| WO | WO 90/01240 | 2/1990 | H04N/1/40 |
| WO | WO 91/09493 | 6/1991 | H04N/5/217 |
| WO | WO 97/25652 | 7/1997 | G03D/5/00 |
| WO | WO 98/19216 | 5/1998 | G03C/5/29 |
| WO | WO 98/25399 A1 | 6/1998 | H04N/1/38 |

| | | | |
|---|---|---|---|
| WO | WO 98/25399 | 6/1998 | ............ H04N/1/38 |
| WO | WO 98/31142 | 7/1998 | ............ H04N/5/253 |
| WO | WO 98/34157 | 8/1998 | |
| WO | WO 98/34157 A2 | 8/1998 | |
| WO | WO 98/34397 | 8/1998 | |
| WO | WO 99/43148 | 8/1999 | ............ H04N/1/00 |
| WO | WO 99/43149 A1 | 8/1999 | ............ H04N/1/00 |
| WO | WO 01/01197 | 1/2001 | ............ G03D/5/00 |
| WO | WO 01/13174 A1 | 2/2001 | ............ G03D/5/06 |
| WO | WO 01/45042 A1 | 6/2001 | ............ G06T/5/00 |
| WO | WO 01/50192 A1 | 7/2001 | ............ G03C/7/407 |
| WO | WO 01/50193 A1 | 7/2001 | ............ G03C/7/407 |
| WO | WO 01/50194 A1 | 7/2001 | ............ G03C/7/407 |
| WO | WO 01/50197 A1 | 7/2001 | ............ G03C/7/42 |
| WO | WO 01/52556 A2 | 7/2001 | ............ H04N/9/11 |

OTHER PUBLICATIONS

"Anisotropic Spectral Magnitude Estimation Filters for Noise Reduction and Image Enhancement", T. Aach, et al., Philips GmbH Research Laboratories, IEEE, pp. 335–338, 1996.

"Adaptive–neighborhood filtering of images corrupted by signal–dependent noise", R. Rangayyan, et al., Applied Optics, vol. 37, No. 20, pp. 4477–4487, Jul. 10, 1998.

"Grayscale Characteristics", The Nature of Color Images, Photographic Negatives, pp. 163–168.

"Parallel Production of Oligonucleotide Arrays Using Membranes and Reagent Jet Printing", D. Stimpson, et al., Research Reports, BioTechniques, vol. 25, No. 5, pp. 886–890, 1998.

"Low–Cost Display Assembly and Interconnect Using InkJet Printing Technology", D. Hayes, et al., Display Works '99, MicroFab Technologies, Inc., pp. 1–4, 1999.

"Ink–Jet Based Fluid Microdispensing in Biochemical Applications", D. Wallace, MicroFab Technologies, Inc., Laboratory Automation News, vol. 1, No. 5, pp. 3, 6–9, Nov., 1996.

"Photorealistic Ink–Jet Printing Through Dynamic Spot Size Control", D. Wallace, et al., Journal of Imaging Science and Technology, vol. 40, No. 5, pp. 390–395, Sep./Oct. 1996.

"MicroJet Printing of Solder and Polymers for Multi–Chip Modules and Chip–Scale Package", D. Hayes, et al., MicroFab Technologies, Inc. (6 pages).

"A Method of Characteristics Model of a Drop–on–Demand Ink–Jet Device Using an Integral Method Drop Formation Model", D. Wallace, MicroFab Technologies, Inc., The American Society of Mechanical Engineers, Winter Annual Meeting, pp. 1–9, Dec. 10–15, 1989.

"Digital Imaging Equipment White Papers", Putting Damaged Film on ICE, www.nikonusa.com/reference/whitepapers/imaging, Nikon Corporation, Nov. 28, 2000.

* cited by examiner

PULSED ILLUMINATION SIGNAL MODULATION CONTROL & ADJUSTMENT METHOD AND SYSTEM

RELATED APPLICATIONS

This application claims priority under 35 U.S.C. §119(e) to U.S. Provisional Application Serial No. 60/173,781 filed on Dec. 30, 1999, entitled PULSED ILLUMINATION SIGNAL MODULATION CONTROL & ADJUSTMENT METHOD AND SYSTEM.

This application is related to the following co-pending applications all filed on Dec. 30, 1999: Ser. No. 60/174,074, entitled METHOD AND SYSTEM FOR ESTIMATING SENSOR DARK CURRENT DRIFT; Ser. No. 60/173,787, entitled DIGITAL FILM PROCESSING METHOD AND SYSTEM; Ser. No. 60/174,073, entitled DIGITAL FILM PROCESSING FEATURE LOCATION METHOD AND SYSTEM and Ser. No. 60/173,780, entitled METHOD AND SYSTEM FOR ESTIMATING SENSOR AND ILLUMINATION NON-UNIFORMITIES.

TECHNICAL FIELD OF THE INVENTION

This invention relates generally to image processing and more particularly to a pulsed illumination signal modulation control and adjustment method and system.

BACKGROUND OF THE INVENTION

During the scanning of photographic images from film, various factors may affect the quality of the resulting digital image. For example, systems used to derive digital images from film may suffer from both sensor and illumination non-uniformities, each of which may adversely effect the signal integrity of the images. Image quality may also depend, in part, on the characteristics of the film. Where digital image data is obtained from developing film, the characteristics of the developing chemical applied to the film may also affect image quality.

For example, processing images from film typically includes capturing digital data from the film with a sensor as the film is illuminated with a light source. Because the illumination levels captured by the sensor represent the image data, any sensor or illumination non-uniformities introduce undesirable errors into the data measurements. Unfortunately, sensor and illumination characteristics typically vary individually and can drift over time due to factors such as heating and/or transient responses in the devices when they are activated and deactivated. Where the film is scanned while being developed, variances in film and chemical developer characteristics often arise due to changes that take place during the development process. Signal levels captured by the sensors may also vary due to factors such as aging of the sensors or light sources.

In addition, some systems may produce inaccurate data due to noise that is introduced by variances in illuminated power as a light source operates. For example, a light source may emit one pulse of illumination, during which a sensor may capture data. Any differences in illuminated power between pulses are captured by the sensor, including sensor or illumination characteristics that change during the development process. These differences may be erroneously interpreted as differences in data content captured from the film.

SUMMARY OF THE INVENTION

From the foregoing, it may be appreciated that a need has arisen for providing a pulsed illumination signal modulation control and adjustment method and system. The present invention substantially reduces or eliminates disadvantages and problems of existing systems.

One aspect of the invention is a method for signal modulation adjustment. The method comprises illuminating a reference target and a region of film with a first light source for a first time interval. The method further comprises capturing image data from the film in response to a first amount of light reflected from the film with a first sensor for a first integration time. The method also comprises approximately simultaneously producing a first reference output in response to a first amount of light reflected from the reference target in a field of view of a reference sensor. More particularly, the method further comprises adjusting the data in response to the reference output. In a further embodiment, the method comprises adjusting an output illumination level of the first light source in response to the first reference output before a next time interval.

The invention provides several important advantages. Various embodiments of the invention may have none, some, or all of these advantages. The invention may improve the accuracy of image data. For example, the invention may compensate for drift or other variations in sensor or illumination source characteristics between image capture sampling times. The invention may automatically adjust illumination levels and/or sensor integration time using a reference or sensing detector. Signal modulation can be stabilized between illumination pulses, to reduce signal noise. The invention may also prevent saturation of sensors in varying film, developer, and illumination conditions.

Alternatively or in addition, the invention may adjust the captured image data to compensate for such variations. For example, sensor and illumination non-uniformities in the image data may be normalized and various gains for the image data may be adjusted using the measured data. Other technical advantages may be readily ascertainable by those skilled in the art from the following figures, description, and claims.

BRIEF DESCRIPTION OF THE DRAWINGS

For a more complete understanding of the present invention and the advantages thereof, reference is now made to the following descriptions taken in conjunction with the accompanying drawings in which.

DETAILED DESCRIPTION OF THE INVENTION

The preferred embodiment of the present invention and its advantages are best understood by referring to FIGS. 1–4 of the drawings, like numerals being used for like and corresponding parts of the various drawings. Opportunities may be created to detect and/or adjust for sensor and/or illumination variations due to temperature fluctuations and/or other nonuniformities during digital film processing. Generally, where a spatial non-uniformity of a light source does not appreciably change between imaging windows, the non-uniformities within a generally linear array of detectors may be assumed to drift up or down together between capture of data columns along film while data from the film is being captured. A reference target may be used to monitor illumination levels as image data is obtained along the film between each imaging window, continually or as desired. For example, where measured illumination levels are likely to drift rapidly enough to affect the quality of the image data, they may be monitored. Then, image data may be adjusted in response to these levels as they change between data columns. This information may also be used to adjust signal modulation before a selected imaging window. This may desirably allow digital film processing to be performed independently of content and/or unexposed regions within the film. It may also ensure that illumination is generally uniform or varies within a small range between each imaging window. The accuracy of captured image data may be desirably improved by compensating for these variations over time. In addition, these adjustments may also accommodate variations in the elevation and density of developing chemicals applied to the film as the film develops.

Figure 1:
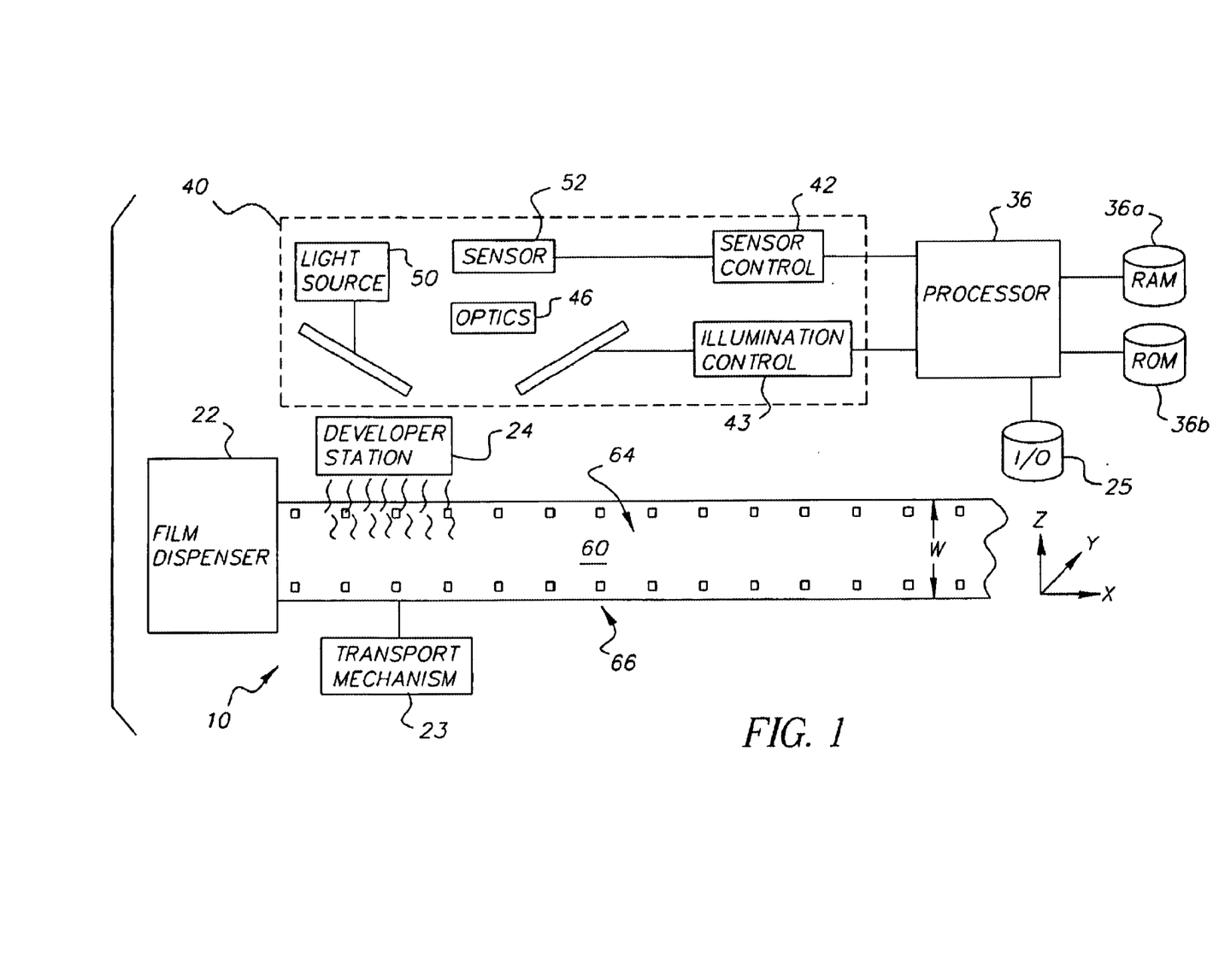
FIG. 1 illustrates an example of a digital film processing system that may be used in accordance with the invention.

FIG. 1 illustrates an example of a digital film processing system 10 that comprises an embodiment of the present invention. Digital film processing system 10 comprises a film dispenser 22, at least one transport mechanism 23, a developer station 24, a processor 36 and at least one input/output device 25, and at least one sensor station 40. Digital film processing system 10 is operable to capture and/or adjust data captured from a film 60 that is disposed proximate to and/or may move at a scan rate relative to sensor station 40. Digital film processing system 10 may desirably improve the accuracy of captured image data by compensating for fluctuations in a variety of parameters over time.

It may be illustrative to utilize a coordinate system to describe digital film processing system 10. For example, sensor station 40 may be disposed in a z direction proximate to, and may be moved at a scan rate relative to, a film 60 operable to store latent image data, such as film. Film 60 may be disposed, for example, in an x-y plane and have a width W in the y direction. By way of example and not by limitation, film 60 may be disposed in a generally vertical orientation, and/or may not be disposed within any single plane, but rather move through a plurality of orientations as sensor station 40 captures image data therefrom. As another example, film 60 may be disposed in a mobius strip configuration so that sensor station 40 may capture image data from both portions 64 and 66. Sensor station 40 may also be disposed proximate to and oriented in various angles relative to film 60.

At least one sensor station 40 is operable to obtain image data from film 60, even while the film may have developing chemicals applied thereto. In other words, the film may be developing, or may be completely developed. Developer station 24 may be used to apply a thin layer of a developing chemical to film 60. By way of example and not by limitation, developer station 24 may be a slot coater or vibrating dispenser that sprays or otherwise applies the developing chemical to film 60. Transport mechanism 23 may be used to move film 60 at a desired scan rate relative to sensor station 40. Film dispenser 22 may be used to retain film 60 and to guide the film onto transport mechanism 23.

Sensor station 40 may be used to capture image data from film 60 and transfers the image data to an input/output device 25 such as a storage medium. Sensor station 40 comprises optics 46, light source 50, sensor 52, sensor control 42, and illumination control 43. Sensor 52 operates in concert with light source 50 and optics 46 to capture or obtain image data from a film 60 such as film.

Any suitable light source 50 and compatible sensor 52 such as those typically used in image processing applications involving photographic images may be used to capture image data for this aspect of sensor station 40. That is, sensor 52 may be any detector whose quantum efficiency, or responsivity, is compatible with a spectrum utilized by light source 50. For example, where light source 50 comprises mostly infrared or near-infrared energy, or energy outside the visible spectrum, sensor 52 is responsively operational to such wavelengths. Such an embodiment may be advantageous when digital film processing system 10 is used to capture image data from developing film because, for example, unexposed film is typically very reflective when illuminated with infrared energy. Such an advantage may facilitate location of unexposed regions of the film during which updating of estimates may be performed. Other combinations of light source and sensors may also be used. Other examples may include, but are not limited to, a light source comprising a single column point source coupled to a scan mirror that may be operated in conjunction with a sensor comprising a point detector coupled to the scan mirror.

In some applications, sensor 52 may comprise a plurality of charge-coupled devices (CCDs), photo diodes, or CMOS sensors. For example, sensor 52 may comprise a digital camera comprising a two-dimensional array of CCDs operable to capture data from a two-dimensional field of view in film 60. Sensor 52 may also comprise a generally linear one-dimensional array, where the array comprises a plurality of detectors such as CCDs. Sensor 52 may also comprise a generally linear array of 4,096 (or any other number) detectors that may be, for example, staggered or linearly aligned within the array. The generally linear array may be operable to capture a data or image column over a generally linear field of view that spans width W (in the y direction) of film 60, or a portion thereof.

Each detector within sensor 52 typically varies in thickness of coating, photoemissive characteristics, optics, etc., and thus typically varies in responsivity to a given amount of illumination. The responsivity of each detector also varies due to noise, age, and temperature. Such variation in responsivity to illumination within each sensor typically results in spatial non-uniformities in the image data. For example, where sensor 52 comprises a generally linear CCD array, variations in the efficiency of each detector in converting photons to electrons results in variations in illumination levels measured by each detector, regardless of variations in the film 60 and/or content therein.

A system signal-to-noise ratio may be measured by a combination of sensor responsivity and illumination characteristics of each sensor station. This signal-to-noise ratio may be improved by selecting sensor 52 for its sensitivity to intensity and wavelength illumination. Further improvements to the accuracy of captured data, and thus to image quality, may also be obtained by matching captured electron levels in sensor 52 to a full dynamic range for each latent image within film 60. For example, the capacity of wells for each detector, that is, the number of photons it may convert to electrons affects the range of discrete digital levels measurable by each detector, regardless of data content within film 60. Wells within sensor 52 may be desirably sized to be sufficiently large to accommodate desired image signal to noise ratios. In addition, digital film processing system 10 may adjust integration time for sensor 52 and/or adjust the illumination power of light source 50 in order to maximize usage of the capacity of each detector well within sensor 52.

In one embodiment of the invention, light source 50 may be arranged in a wave guide. Each wave guide may comprise a plurality of illuminators, such as light emitting diodes (LEDs). Light may be directed through wave guide 50 to film 60 and then diffusely reflected to sensor 52. Any suitable optics 46 for use with light source 50 and sensor 52 may be used to produce desired optical effects in the image captured by sensor 52. For example, optics 46 may be used to focus, magnify or enlarge data in film 60 to a desired image resolution for an application, such as 12 μm per pixel. Optics 46 and light source 50 may be manually or automatically controlled by, for example, processor 36.

Processor 36 may be used for image data processing and adjustment in accordance with the present invention. Processor 36 may also control the operation of sensor station 40 by using sensor control 42 and/or illumination control 43. Alternatively or in addition, processor 36 may control sensor station 40 by, for example, executing software that may be stored in an input/output device 25 such as a storage medium. Although a single input/output device 25 has been illustrated for simplicity, input/output device 25 may comprise multiple storage media as well as comprising storage media of different types. Moreover, although illustrated as separate units, processor 36 may perform some, none, or all of the logic functions described as being performed within illumination control 43 and/or sensor control 42.

Specifically, processor 36 may be used to execute applications comprising image data processing and adjustment software. Image data processing and adjustment may be performed using special purpose digital circuitry contained either in processor 36, or in a separate device. Such dedicated digital circuitry may include, for example, application-specific integrated circuitry (ASIC), state machines, fuzzy logic, etc. Processor 36 may also comprise a portion of a computer adapted to execute any of the well known MS-DOS, PC-DOS, OS2, UNIX, MAC-OS and Windows operating systems or other operating systems, including nonconventional operating systems. Processor 36 may comprise random access memory (RAM) 36a and read only memory (ROM) 36b, and may be coupled to one or more input/output devices 25. These devices may include, but are not limited to, printers, disk drives, displays and a communications link. Disk drives may include a variety of types of storage media such as, for example, floppy disk drives, hard disk drives, CD ROM drives, or magnetic tape drives.

Input/output device 25 comprising a communication link may be connected to a computer network, a telephone line, an antenna, a gateway, or any other type of communication link. Image data captured from other than digital film processing system 10 may also be adjusted in accordance with the invention. For example, processor 36 may be coupled to an external network that may be used to obtain image data, such as a scanner or camera system. Captured image data may then be provided to processor 36 from a computer network over the communication link.

The present invention includes programs that may be stored in RAM 36a, ROM 36b, or input/output device 25 such as one or more disk drives, and may be executed by processor 36. In this embodiment, image data adjustment may be performed by software stored and executed by processor 36 with the results stored in an input/output device 25 comprising any suitable storage medium. Image data may be processed as it is obtained, after all data has been captured, or a combination thereof.

Illumination control 43 may be used to control the amount of optical energy given off by light source 50, both in time and in amplitude. For example, it may be desirable to adjust the output optical energy from light source 50 if sensor 52 is saturating, or if illumination levels are otherwise determined to be too high or too low. Illumination control 43 may also include additional circuitry used to interface the logic with light source 50.

Sensor control 42 may be used for data transfer and/or processing and to control activation and deactivation of sensor 50. For example, sensor control 42 may convert an analog signal to a digital pixel value, or transfer pixel data stored in sensor 52 where sensor 52 has an internal memory. In some applications, sensor 52 may also comprise logic, such as a programmable processor, that may adjust or process pixel data as desired, before the pixel data is transferred into a memory or storage medium. Such a processor may perform the functions of sensor control 42. In addition, sensor control 42 may also include a bias control to improve system dynamic range. For example, sensors may retain residual charge that decreases the amount of usable sensor capacity, for example, in shift registers, a phenomenon known as image lag. Sensor control 42 may desirably increase the system dynamic range by applying a bias to sensor 52 to reduce the effect of this residual scene content on newly captured image data. Sensor control 42 may comprise software, hardware, or a combination thereof.

Sensor control 42 may also be used to control activation and deactivation of sensor 52, independently of or in conjunction with light source 50. For example, sensor 52 may comprise a mechanical or electronic shutter mechanism for controlling a dwell or integration time in which the sensor may convert a number of photons received into electrons. When light source 50 is activated, sensor 52 integrates over an interval of time signals reflected from film 60. By so controlling a combination of illuminated power and sensor integration time, digital film processing system 10 may adjust an amount of illumination measurable by sensor 52 and thus system dynamic range as desired.

Digital film processing system 10 may obtain data from many kinds of images, such as color photographic images (either negative print or transparency), black and white images (either negative print or transparency and including black and white images derived from photographic film with multiple layers), other monochromatic images, x-rays, or any other type of image stored on film 60. Digital film processing system 10 may capture data from any tangible film 60 that may both reflect back and pass through illumination from a light source. One example of film 60 is discussed in conjunction with FIG. 1A.

Figure 1A:
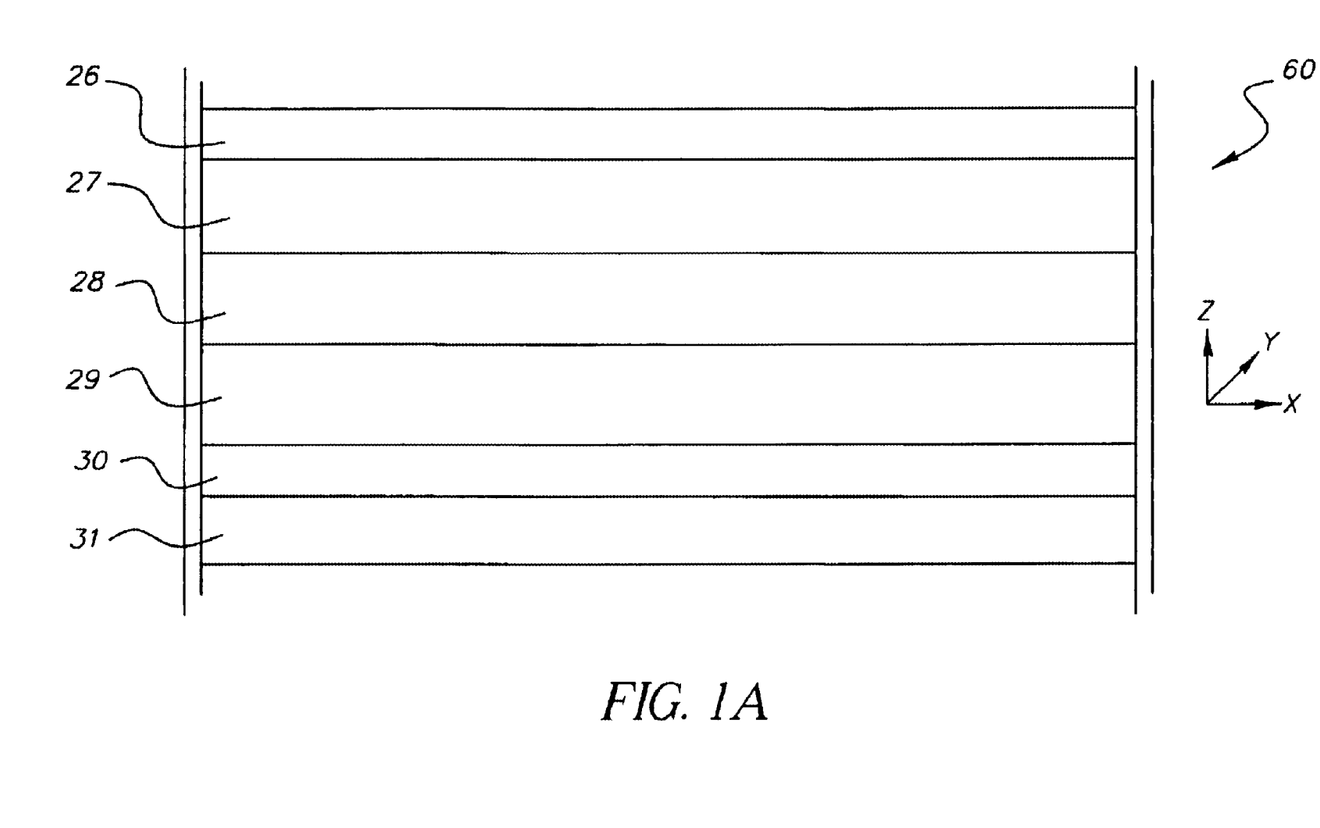
FIG. 1A illustrates an example of a cross section of film from which image data may be captured.

FIG. 1A illustrates an example of a cross-section of film from which image data may be captured. Color film 60 typically comprises three color emulsion layers—e.g., a blue layer 27, a green layer 28 and a red layer 29—that are stacked on an antihalation layer 30. These four layers are typically stacked on a transparent base substrate layer 31. Each of these layers and their density affect the incident angle of light transmitted through the film and thus the illumination levels measured by sensor 52. In some applications, a developing chemical layer 26 may be applied to film 60.

Film types vary with respect to the density of the antihalation layer, layer configuration, and thickness of the base layer. The density of film may also vary with respect to image content therein. For example, photographic film contains grains held on a substrate, such as silver-halide, as part of its physical makeup. These grains are a function of the latent image on the film, as well as the type and format of the film, with faster-speed and smaller-format film exhibiting more graininess.

Developing chemical layer 26 may vary in thickness in the z direction between different points on the film, and may also affect the apparent density of the film. During a film development process, grains within the film that were exposed to the most light are the first to develop, and other grains develop as the development process continues. Those areas in which the most grains develop for a given layer will have the greatest density and lowest resultant pixel values. For example, images may contain areas of low-light shadows that contain many more grain traces than areas of bright sky. In addition, as film develops, it increases in density as silver is formed from compounds within the film, thus permitting latent images to be obtained by sensor 42.

Sensor 52 is operable to measure light intensity within a spatial location of an image in film 60, even while film 60 is developing, or still has developing chemical applied thereto. These measurements may be obtained from silver formed from compounds within film 60, rather than from dyes within each of layers 27–29 after the developing chemical has been removed. Each intensity value associated with the intensity of light at that spatial location in the original image in film 60 corresponds to one of a series of pixels within an image as captured and/or stored by image capture engine 34. The intensity refers generally to a pixel's brightness. For example, a white pixel has greater intensity values than a gray or black pixel. Thus, for pixels that comprise eight bits of resolution, a black pixel typically has an intensity value of close to zero, whereas a white pixel has an intensity value of close to 255. The range of light intensities within an image on film may be referred to as a dynamic range of the image. The use of white and dark pixels as used in this specification is not meant to impart any meaning to the content of image data. For example, white and dark pixels within a film negative would have the opposite meanings for a positive image print.

Figure 2A:
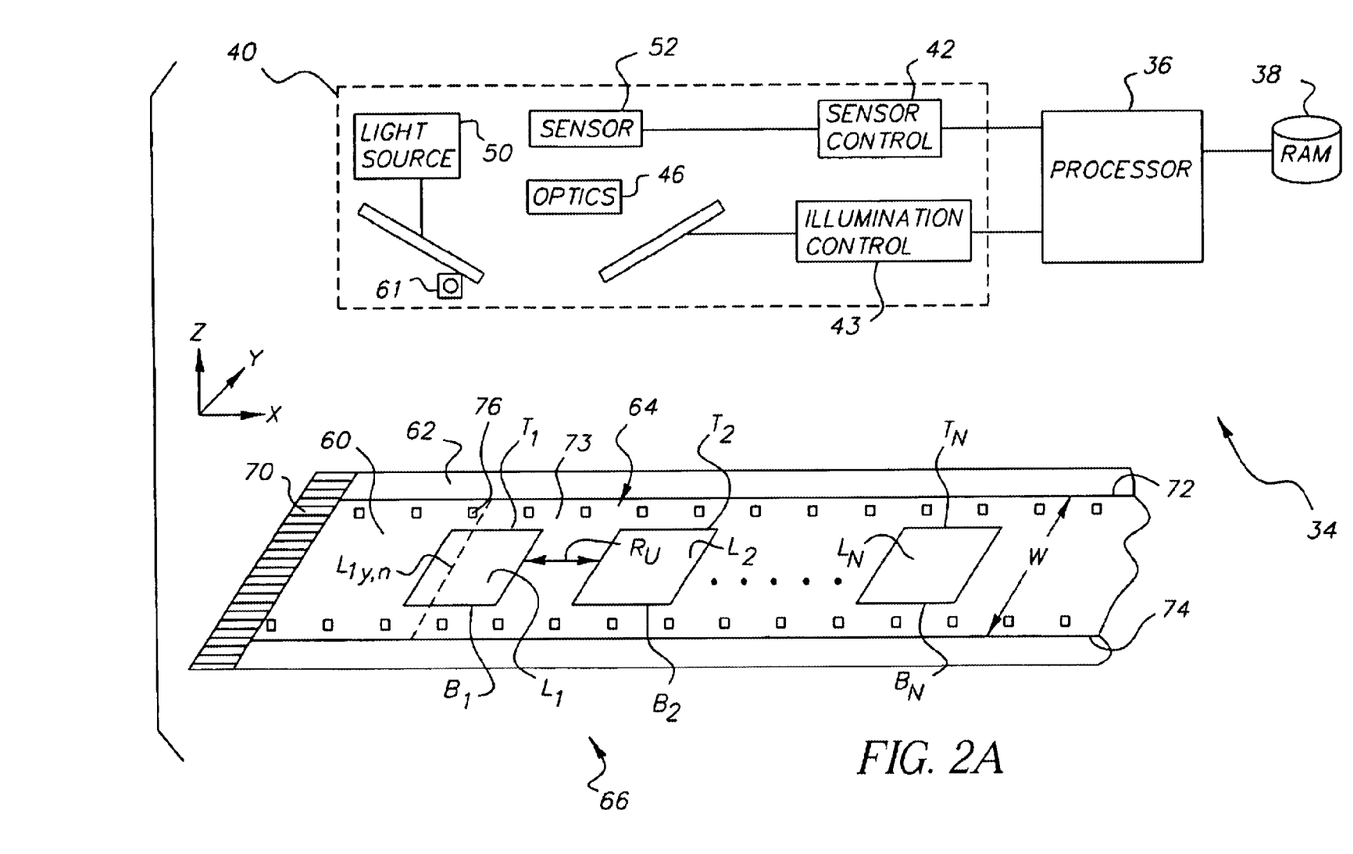
FIG. 2A illustrates an example of an image capture engine that comprises an embodiment of the present invention.

FIG. 2A illustrates an example of an image capture engine that comprises an embodiment of the present invention. Image capture engine 34 may be a portion of digital film processing system 10 and comprises processor 36, storage medium 38 and sensor station 40. Image capture engine 34 may also capture data from film 60, including a reference targets 62 and/or 70 and/or a leader 73. Image capture engine 34 may utilize reference target 62 to monitor variations in illumination as image data is captured, and/or may adjust signal modulation to respond to such variations.

Reference target 62 is desirably disposed near film 60 and may be imaged with one or more suitably located detectors whose field of view is limited to a portion thereof (reference detectors (not explicitly shown)). For example, reference target 70 may be disposed so that it blocks or obstructs the field of view of film 60 to detectors within sensor 52. Similarly, reference target 62 may be disposed adjacent to each side of film 60, or at any sprocket holes therein. Alternatively or in addition, reference targets 62 and/or 70 may be moved into and out of the field of view of the one or more reference sensors at selected times as desired. For example, reference target 70 as illustrated may be moved in a generally y direction into and out of this field of view.

Any suitable reference target may be used that is desirably reasonably and uniformly reflective and/or transmissive of the wavelength of light source 50, and whose dynamic range is within the expected range of weakest to strongest signals expected from the range in film types. Such a reference target 62 may desirably reduce the possibility of sensor saturation that may result from gain adjustments of the weakest and/or strongest signals.

Figure 2B:
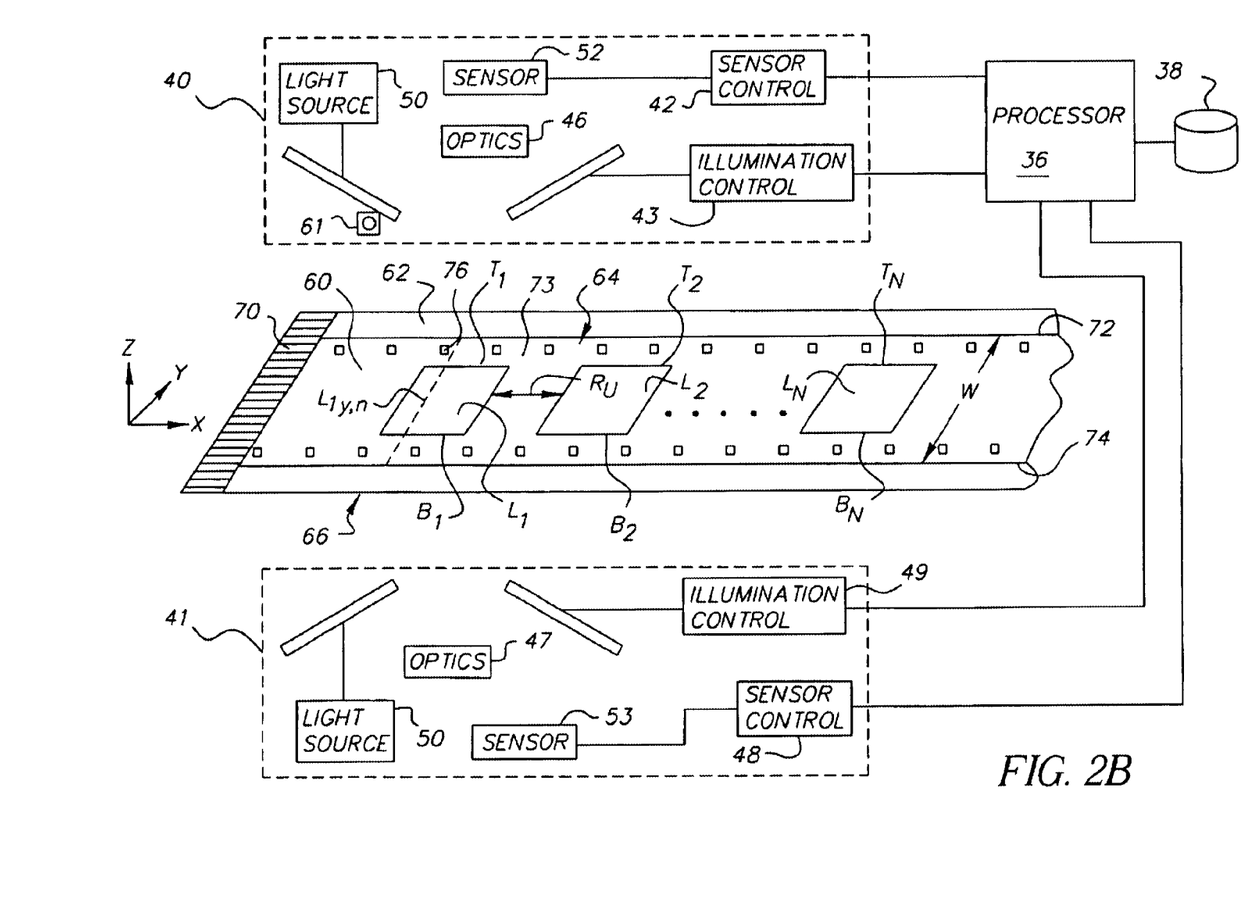
FIG. 2B illustrates another example of an image capture engine that comprises another embodiment of the present invention.
Figure 2C:
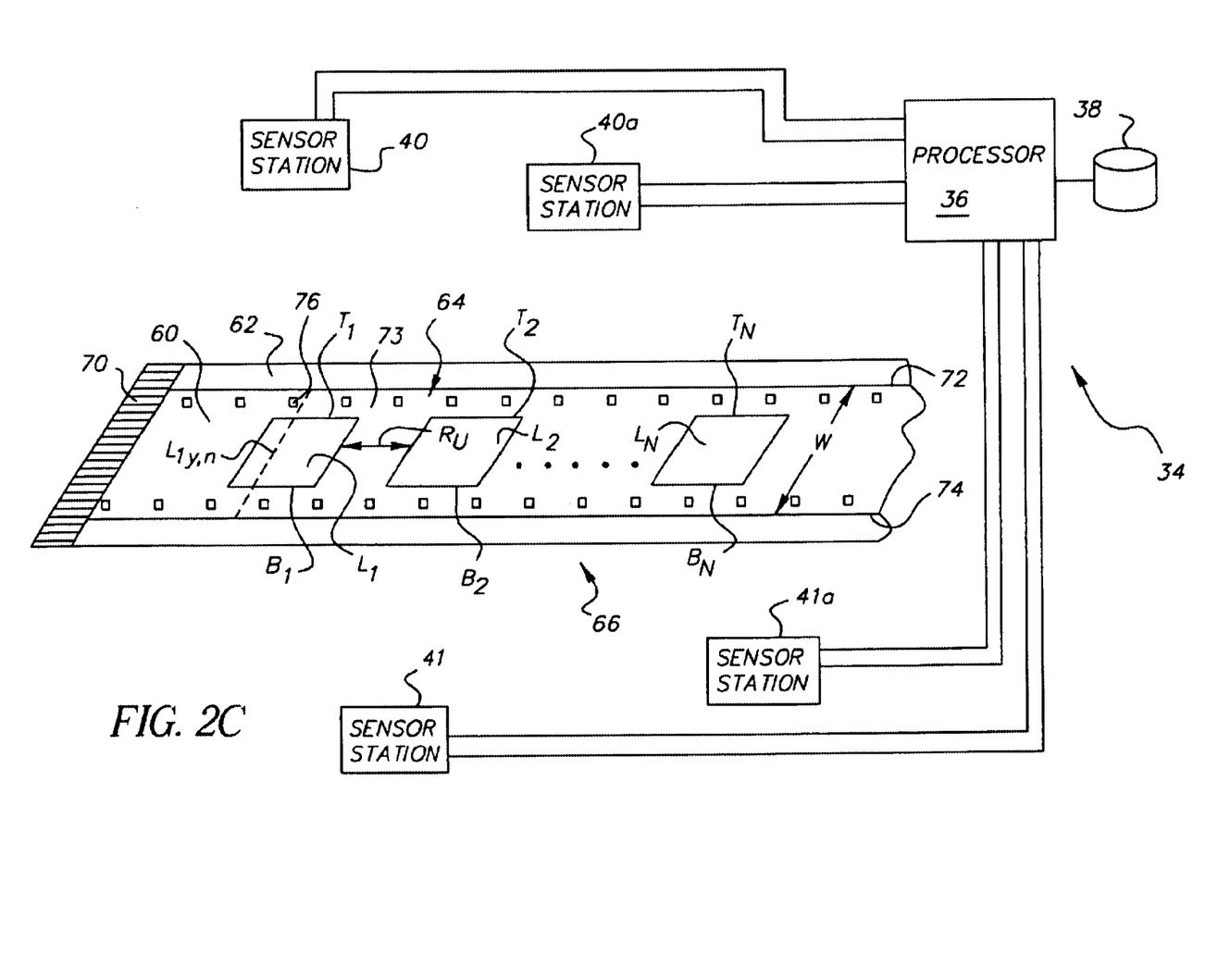
FIG. 2C illustrates another example of an image capture engine that comprises another embodiment of the present invention.

Each of these reference detectors within sensor 52 may be used to image reference target 62 and/or 70 through one or more sprocket holes of film 60 or may be moved relative to reference target 62 and/or 70. Because these reference detectors are subject to similar heating and noise characteristics of image capture engine 34, they are desirably similar in responsivity and characteristics such as noise, dynamic range, etc. to the detectors within sensor 52. Such reference detectors also desirably provide a generally true estimate of the energy levels measurable by sensor 52. One or more of these reference detectors may be included within sensor 52, or be disposed proximate to sensor 52. For example, where reference target 62 as illustrated in FIGS. 2A–2C may be disposed adjacent to each side of film 60, one or more reference detectors in a generally linear array sensor 52 may be used to capture image data from reference target 62. To illustrate, where sensor 52 comprises 4096 detectors, a first plurality of reference detectors representing pixel zero through 128 may be used to image a first portion of reference target 62. Detectors 129 through 3966 may be used to capture data from film 60, and reference detectors 3967 through 4095 may be used to capture data from second portion of reference target 62. Other configurations for reference detectors may also be utilized.

To illustrate this aspect of the invention, sensor 52 may comprise a generally linear array operable to capture a data or image column over a generally linear field of view that spans width W (in the y direction) of film 60, or a portion thereof. For example, FIG. 2A illustrates a column $I_{1_{(y,n)}}$ that represents data that may be obtained from film 60 from one column in the y direction through image $I_1$ at row x=n.

Film 60 is illustrated with a width W in the y direction measured between a top edge 72 and a bottom edge 74. Film 60 may comprise a single image frame $I_1$, or a plurality of image frames $I_1$–$I_n$ disposed along the film in the x direction. Each image frame $I_1$–$I_n$ may be the same or a different size. For example, image frame $I_1$ may be an image represented by a×b pixels, where a and b are any integer. That is, image $I_1$ includes a plurality of pixels or columns in the x direction, and b pixels or rows in the y direction. For example, each image frame $I_1$–$I_n$ may include 1024×1024 pixels, where a=b=1024. A plurality of image frames $I_1$–$I_n$ is illustrated to discuss one aspect of the invention. In commercial films 60, each of these image frames $I_1$–$I_n$ may be separated by an unexposed region $R_u$. Some films 60 may also include one or more sprocket holes 76.

In operation, sensor station 40 obtains image data from film 60 and transfers the image data to a storage medium such as storage medium 38. Image capture engine 34 may create opportunities for monitoring and adjusting signal modulation to accommodate for variations over time and/or due to changes in temperature. For example, film 60 may comprise an area of unexposed film—the leader 73—which precedes or trails a plurality of image frames $I_1$–$I_n$, in addition to an unexposed region or gutter $R_u$ between each image frame $I_1$–$I_n$. Image capture engine 34 may also use some or all of these unexposed regions in the film to provide initial estimates for film characteristics, measurable illumination levels, and/or drift rates.

To monitor and reduce the effects of spatial illumination level non-uniformities between various image capture times, image capture engine 34 may adjust signal modulation as desired by controlling a combination of illuminated power and sensor integration. Signal modulation may be adjusted by adjusting the pulse width and/or the output amplitude of light source 50, and/or the integration time of sensor 52. Generally, sensor integration time may be combined, and traded off, with a level of illumination power to obtain an effective illumination time or illumination level that may be captured by a sensor. For example, an increased effective illumination time may be obtained by either increasing sensor integration time at a given illumination power, or increasing the power of illumination at a given sensor integration time. Effective illumination time may be similarly decreased by decreasing sensor integration time or decreasing illuminated power under similar conditions. Thus, in applications where it may be desirable to capture images within a short time period, higher illumination levels may in some cases be used with a shorter sensor integration time. This provides the advantage of allowing the full sensitivity of sensor stations to be used for each image while avoiding saturation of sensor 52, thus optimizing the dynamic range for the sensor. Such monitoring and adjustment may also facilitate matching the system dynamic range to the dynamic range of each image.

To illustrate, in one embodiment of the invention, at least one sensing detector 61 may be used to measure illumination levels of light source 50. Sensing detector 61 may be, for example, a photodiode, and have a field of view restricted to illumination from light source 50. Any suitable configuration for a sensing detector 61 may be used that provides a reasonably true estimate for the optical power output levels for an integration time during a pulse from light source 50 without capturing additional ambient or reflected light. For example, sensing detector 61 may be mounted on light source 50. Image capture engine 34 may then utilize the sensor, camera and/or illumination drift data measured from the sensing detector 61 and/or reference detectors to adjust image data.

Illumination control 43 may be used to control the amount of optical energy given off by light source 50, both in time and in amplitude. Illumination control 43 may also comprise logic suitable to respond to readings from sensor 52 or sensing detector 61, prior readings such as amplitude and/or pulse width from light source 50, and/or film characteristics. This logic may be software, hardware, or a combination thereof, and may be utilized to, for example, adjust an input current to light source 50 that accordingly adjusts an output optical energy, or illumination level. Illumination control 43 may also comprise additional logic that is operable to accept pulse width control signals from processor 36 as desired. Alternatively or in addition, illumination control 43 may comprise amplitude control logic, which may be software, hardware, or a combination thereof. The amplitude control logic may be responsive to a film type or an operating point, that may be input to or stored in a memory of illumination control 43, and/or to signal amplitudes of sensors 52 and/or 53, respectively. Illumination control 43 may also include additional circuitry used to interface the logic with light source 50. Sensor control 42 may also control the dwell or integration time of sensor 52.

To operate independently of variable image data content, image capture engine 34 may desirably monitor illumination levels and/or adjust signal modulation for expected data within film 60 before capturing image data for each image. Image capture engine 34 may apply a gain in response to these illumination levels to desirably maximize the dynamic range of the image by mapping intensity values of each location to all usable pixel values (for eight-bit data, there are 256). Thus, to identify a nominal illumination level to be expected at the time of image data capture, image capture engine 34 may utilize one or more of these regions of unexposed film, which comprise a relatively uniform region of the highest light intensities. The adjustment can be made with or without developer on the film. Image capture engine 34 may also use some or all of these unexposed regions to adjust signal modulation and/or to adjust the image data. Image capture engine 34 may also adjust image data after it has been captured to correct or compensate for these variations that may have been present while the image was captured. Such an advantage may avoid sensor saturation and/or overflow in calculations used to produce the digital image, and improve the quality of the resultant digital image. One method for utilizing such an external reference 62 and adjusting signal modulation to achieve desired illumination levels is illustrated and described in further conjunction with FIG. 4.

FIG. 2B illustrates another example of an image capture engine that comprises an embodiment of the present invention. Image capture engine 34 may also be a portion of digital film processing system 10 and comprises processor 36, storage medium 38 and sensor stations 40 and 41. Sensor stations 40 and 41 may be used to capture image data from film 60 and may be similarly configured, operated and/or controlled. For example, similar to sensor station 40 as discussed in conjunction with FIG. 1, sensor station 41 may be disposed in a z direction proximate to, and may be moved at a scan rate relative to, film 60. Film 60 may also move through a plurality of orientations as both sensor stations 40 and 41 capture image data therefrom. Sensor stations 40 and 41 may also be disposed proximate to and oriented in various angles relative to film 60.

Sensor station 41 comprises optics 47, light source 51, and sensor 53, and may also comprise its own sensor and illumination control 48 and 49. Alternatively, sensor station 41 may share sensor and illumination controls 42 and 43 with sensor station 40. In this embodiment, sensor station 40 may be located proximate to the top surface 64 of film 60, and sensor station 41 may be located proximate to bottom surface 66 of film 60. Sensors 52 and 53 operate in concert with light sources 50 and 51 and optics 46 and 47 to capture or obtain image data from film 60. Light sources 50 and 51 may utilize the same or different frequencies.

Sensor station 40 and sensor station 41 measure illumination levels through various incident angles of light reflected from and/or passed through film 60 to generate a resultant image. For example, sensor 52 may be used to capture light from light source 50 reflected from film 60 and/or light from light source 51 illuminated through film 60. Similarly, sensor 53 may be used to capture light from light source 51 reflected from film 60 and/or light from light source 50 illuminated through film 60. Each combination of a sensor and light source provides a sensor view. Image capture engine 34 may later adjust and combine the image data captured from one or more views by sensor stations 40 and/or 41 into various representations of one or more single images.

Processor 36 may control the operation of sensor stations 40 and 41 by using sensor controls 42 and 48 and/or illumination control 43 and 49. Alternatively or in addition, processor 36 may control sensor stations 40 and/or 41 by, for example, executing software that may be stored in storage medium 38. Also alternatively or in addition, processor 36 may comprise two individual processors. Each of these processors may control a respective sensor station.

Similar to illumination control 48 as discussed in conjunction with FIG. 1, illumination control 49 may be used to control the amount of optical energy given off by light source 51, both in time and in amplitude. Sensor controls 42 and 43 may be used to control activation and deactivation of sensors 52 and 53 respectively, independently of or in conjunction with light sources 50 and 51. Sensors 52 and 53 may integrate over a different intervals of time signals reflected from and transmitted through film 60 from light sources 50 and 51. Where a given illumination level may be desirable, each sensor 52 and 53 may integrate over a unique interval of time that may vary to capture varying amounts of illuminated power, depending on parameters such as dynamic range or a desired imaging window time. Image capture engine 34 may thus control a combination of illuminated power and sensor integration time as desired.

Image capture engine 34 is also operable to monitor illumination levels and/or adjust signal modulation as described above. In one embodiment, an additional sensing detector 61, as described in FIG. 2A, may be coupled to or mounted on light source 50 and/or 51. In another embodiment, reference detectors, as described in FIG. 2A, associated with sensor stations 40 and 41 are each operable to capture energy levels reflected and/or illuminated through reference target 62 and/or 70 from light sources 50 and 51.

FIG. 2C illustrates another example of an image capture engine that comprises an embodiment of the present invention. In this embodiment, image capture engine 34 may also be a portion of digital film processing system 10 and comprises additional sensor stations 40a and 41a to monitor the reaction of developing film at one of a plurality of development times for the film. These additional sensor stations may provide additional information with respect to variances in film characteristics as film 60 develops. Any number of additional sensor stations 40a and 41a may be used within the scope of the invention.

In some applications, sensor stations 40a and/or 41a may be disposed proximate to and at various intervals along the x direction of top portion 64 and bottom portion 66. Film 60 may move relative to these sensor stations at one or more scan rates where, for example, more than one transport mechanism 23 may be used. Each sensor station may be controlled with a common processor 36, or may be controlled with its own processor (not explicitly shown). Image capture engine 34 may later adjust and combine the image data captured from the plurality of sensor stations 40 and/or 41 into various representations of one or more single images.

Image capture engine 34 is also operable to monitor and/or adjust illumination levels as described above. Additional sensing detectors 61 and/or reference detectors as described in FIGS. 2A and 2B are associated with sensor stations 40, 40a, 41, and 41b. In this embodiment, the reflectivity of reference target 62 may remain the same or may change from sensor station to station. For example, reflectivity for reference target 62 for a last sensor station disposed in the x direction may desirably be decreased relative to a first sensor station where film 60 comprises developing film. As film develops, its density increases and it captures more light as the density of silver increases. Therefore, reference target 62 may approximate the varying levels of illumination received by a sensor reflected from a developing film whose density changes. Image capture engine 34 may also utilize information provided by these other additional sensor stations to adjust illumination levels accordingly at various development times.

Figure 3:
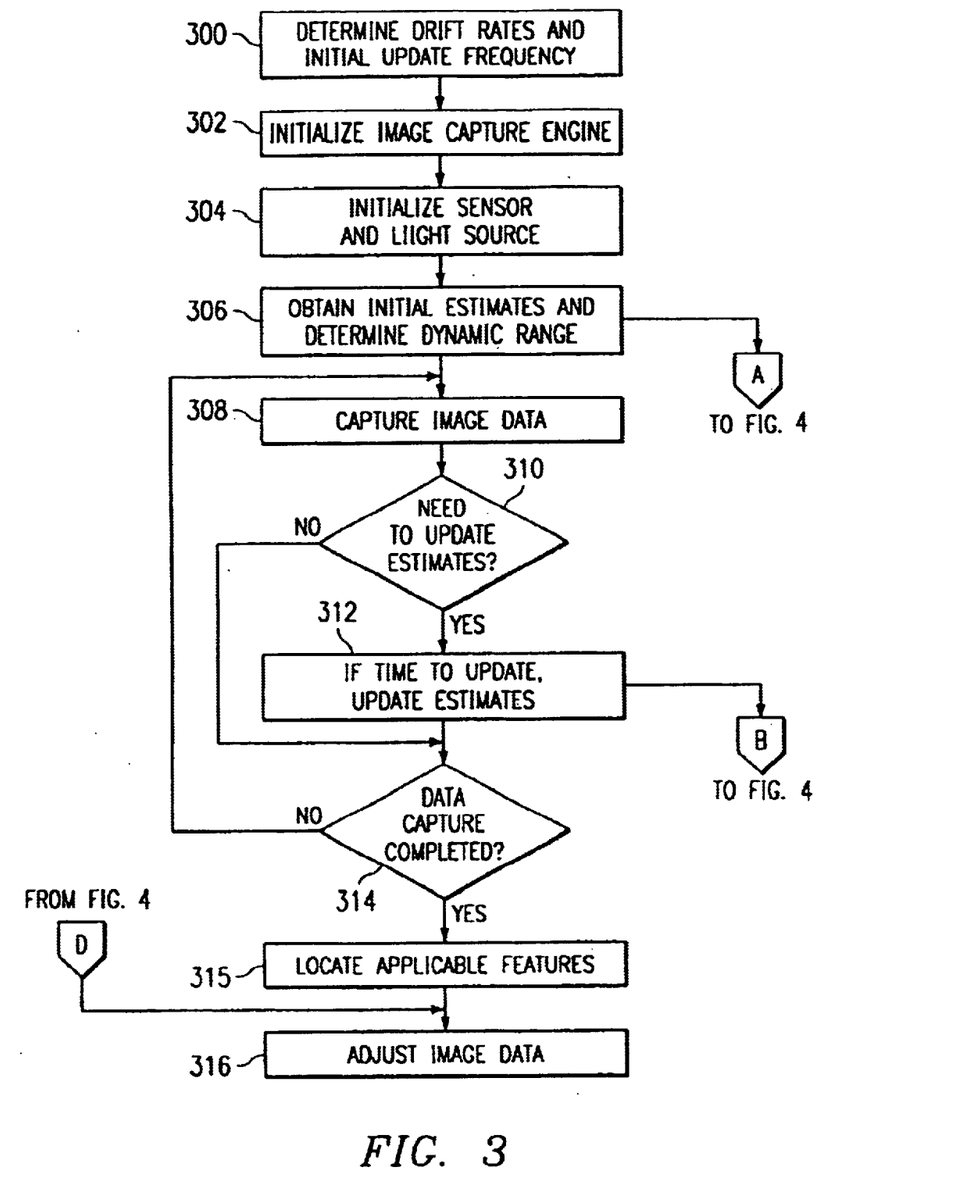
FIG. 3 illustrates an example of a method for capturing and adjusting image data in accordance with the present invention.

FIG. 3 illustrates an example of a method for capturing and adjusting image data in accordance with the present invention. While sensor station 40 is used to illustrate this aspect of the invention, the method discussed in conjunction with this FIG. 3 may be used with any number of sensor stations and/or views. Image capture engine 34 may also selectively perform the method using some or all of these sensor stations and/or views as desired.

Steps 300–316 comprise one embodiment of a method for obtaining and adjusting image data by image capture engine 34. Although steps 300–316 are illustrated as separate steps, various steps may be ordered in other logical or functional configurations, or may comprise single steps. It may be helpful to describe generally the method before describing each particular step. Image capture engine 34 may first optionally determine drift rates for sensor 52 and/or light source 50, and determine in response to the drift rates whether illumination levels need to be monitored. Image capture engine 34 may then be optionally initialized with a set of parameters suitable for adjusting data captured from film 60. Image capture engine 34 may then obtain initial estimates for sensor, film and illumination parameters. Image capture engine 34 may monitor illumination levels and adjust signal modulation during the various steps within the method while it is capturing data from film 60, and/or may adjust image data after the data is captured.

Because both sensor 52 and light source 50 may drift in sensitivity/efficiency over time due to factors such as temperature, image capture engine 34 may be designed to be operable using sensor 52 and light source 50 whose drift rates may be determined or estimated in optional step 300. For example, these drift rates may be empirically measured. Image capture engine 34 may utilize these drift rates before or during data capture to determine whether, or how often, to monitor illumination levels so that the dynamic range for image capture engine 34 is closer to the dynamic range for image data to be captured. Such an advantage may improve the signal integrity obtained by image capture engine 34 and thus the signal integrity of each processed image. This determination may be performed in step 300, or at any suitable place in the method. In the embodiment illustrated in this FIG. 3, this determination is performed in step 310. Image capture engine 34 may also dynamically vary the frequency for monitoring the illumination levels as desired. Image capture engine 34 may adjust image data after all data has been captured from film 60, or after each pixel, column, or two-dimensional region has been captured, as desired. Image capture engine 34 may also control integration time for sensor 52 and/or illumination levels for light source 50 before a region of data is captured. One example of a method for such a priori control is discussed in conjunction with FIG. 4.

In step 302, each sensor station within image capture engine 34 may be optionally calibrated with some initial operating characteristics. Initializing sensor station 40 in image capture engine 34 may reduce variations in optical power over a period of time and/or due to temperature. For example, diodes within light source 50, and/or detectors within sensor 52, generally produce thermal transients that follow an impulse upon activation, or turn-on, and decline approximately exponentially over a short period of time. Therefore, it may be desirable to establish a stable operating point or level for light source 50 and sensor 52 to reduce fluctuations in output power and sensitivity. Establishing an input operating point for light source 50 in turn may stabilize the available signal strength that may be received by sensor 52, and may reduce the possibility that excess illumination may saturate sensor 52. In other words, this may reduce fluctuations in the dynamic range of image capture engine 34. In one embodiment of the invention, image capture engine 34 may be stabilized by waiting a short period of time, for example, sixty seconds, in order for light source 50 and sensor 52 to reach a nominal operating level. Such levels may be set automatically or manually.

In some applications, it may be desirable to avoid waiting for sensor station 40 to adjust to equilibrium. In such a case, light source 50 may be adjusted to compensate for illumination along a thermal transient output power decay curve while, for example, LED and/or CCD devices warm up. For example, an input current to light source 50 may be increased/decreased to stabilize its optical output power thereby keeping the image capture engine in a linear operating region. Sensor 52 may then be used to capture image data from film 60 while its responsivity is in a linear range with respect to light source 50.

In step 304, image capture engine 34 initializes sensor 52 and light source 50. In this step, image capture engine 34 may optionally adjust and/or set sensor and illumination levels for a film type. For example, image capture engine 34 may adjust and/or set an integration time of sensor 52 and/or an illumination power of light source 50 for an expected density of the film type and expected signal strength. These adjustments may desirably prevent saturation of sensor 52 during capture of image data in image regions within film 60. In one embodiment of the invention, an initialization set point for such parameters may be automatically chosen if variation in film types is large. Such set points may be stored in, for example, tables, variables, files, or in any other suitable arrangement in RAM 36a, ROM 36b, and/or storage medium 38, or may be manually chosen. On the other hand, if variation between film types is small then some nominal set point may be chosen.

Alternatively or in addition, image capture engine 34 may in step 306 use leader 73 to obtain initial estimates of the density of film 60 and determine initial illumination levels. These estimates may be established by obtaining a plurality of readings within a region, such as a column, from leader 73, or obtaining substantially all data therefrom, whether or not a chemical developer has been applied.

In step 308, image capture engine 34 begins capturing data from film 60, by illuminating film 60 using light source 50 and capturing data with sensor 52. Details for storing and processing captured image data are discussed in conjunction with step 316. As previously discussed, image capture engine 34 may capture two-dimensional image data from film 60 by utilizing a two-dimensional sensor 52, such as a staring array. Alternatively, a generally linear array sensor 52 may obtain a data or image column along the y direction of film 60 as illustrated in FIGS. 2A–2C. Film 60 may be moved at a scan rate relative to sensor 52 in the x direction as illustrated in FIGS. 2A–2C to obtain a two-dimensional plurality of columns for each latent image in film 60.

Image capture engine 34 may use an imaging window during which one or more sensors and/or light sources may be used to obtain image data from film 60. The duration of such an imaging window may be a length of time sufficient to obtain a desired resolution, such as 12 μm per square pixel. For example, if a square pixel is desired, optics 46 and a generally linear sensor 52 may be suitably adjusted to obtain data in the y direction of 12 μm. Then, image capture engine 34 may adjust the scan rate to obtain the desired resolution of 12 μm in the x direction. At a next imaging window, sensor 52 may capture a next column of data from film 60, and repeat this process until all image data from film 60 has been captured. Alternatively, a two-dimensional sensor 52 may be used to obtain image data for a two-dimensional region from film 60 by using a similar process.

In step 310, image capture engine 34 determines whether to monitor illumination levels and/or to adjust signal modulation. Where sensor and illumination drift rates are slow relative to the time to capture data from film 60 (total data capture time), image capture engine 34 may determine that no monitoring or adjustment need be performed. Image capture engine 34 may then proceed to step 314. Alternatively, image capture engine 34 may determine when to perform and/or measure for adjustments as desired, in step 312. This step may be omitted in some embodiments of the invention, or performed at other stages, such as before each image frame. The invention may include measuring reference and sensed illumination levels, adjusting image data, and/or signal modulation adjustment, after which image capture engine proceeds to step 314 and back to step 308 to capture a next set of image data.

For example, where illuminator drift rates are fast relative to the total data capture time, illumination variations within an image frame, from image to image, or from sensor station to sensor station may be erroneously interpreted as variations in data content. Therefore, image capture engine 34 may create opportunities to monitor and/or adjust illumination levels. Image capture engine 34 may also optionally use the captured data to control sensor 52 and/or light source 50 before the next column or region of data is captured by, for example, adjusting illumination power (such as pulse width and/or amplitude) and sensor integration time. One method for utilizing such an external reference 62 and adjusting signal modulation to achieve desired illumination levels is illustrated and described in further conjunction with FIG. 4.

In step 314, image capture engine 34 optionally determines whether all image data from film 60 has been captured. For example, the invention also contemplates on-the-fly image data adjustment, where image capture engine 34 may adjust image data after some or all of the image data has been captured from film 60. In this example, if all image data has not been captured, image capture engine 34 returns to step 308 to continue the method. If so, image capture engine 34 proceeds to step 316 to adjust the captured image data.

Image capture engine 34 may perform adjustments in step 316 to image data captured using information obtained during steps 304–312. Image capture engine 34 may determine a gain using data captured by reference detectors to apply to image data captured by sensor 52. Normalizing the gains of captured image data may also avoid overflow in calculations. Image capture engine 34 then applies these adjustments to the captured image data to reduce the effects of spatial non-uniformities in the captured image data. Because the method may adjust image data captured at a plurality of times, the integrity of the image data may be improved notwithstanding any changes in film density as film 60 develops.

Image capture engine 34 may perform adjustments as frequently as desired as discussed above, on data captured or received by any digital film processing system 10. Although a plurality of embodiments of an exemplary image capture engine 34 that may be used for image adjustment in connection with the invention have been illustrated, other image capture engines may be used without departing from the scope of the invention.

Processing may be performed as desired, including, but not limited to, a pixel, array (such as a data column), or image frame basis. Processing may also be performed in parallel or pipelined. Any or all non-uniformities need not be completely removed during adjustment to fall within the scope of the invention. Accordingly, adjustment includes, but is not limited to, reduction of non-uniformities or errors, or other alterations of pixel data in the captured image. To illustrate this aspect of the invention, adjustment is performed on image data captured in data columns by a generally linear sensor that comprises a plurality of detectors.

Captured and/ or adjusted image data, as well as data captured from monitoring illumination levels, may be stored as pixel values representing the measured sensor illumination levels. These data may be stored in non-volatile memory such as storage medium 38 for subsequent processing, and/or stored in RAM 36a, ROM 36b, or in other storage media within image capture engine 34 for near-simultaneous processing.

Averaging or an equivalent thereto may reduce or eliminate other high frequency defects that may be due to external factors. Image capture engine 34 may also optionally ensure that image data captured in the x direction is spatially uniform, by using one of many methods to normalize these estimates. For example, image capture engine 34 may determine a new gain factor, or gain level, from the data captured from the unexposed region to achieve the effect of an approximately uniform instantaneous scan across an image frame, and/or the roll of film. This reduces or removes the effects of spatial illumination non-uniformities from subsequent data captured within the image frame. This illumination gain factor may be calculated for illumination measurements by a method such as the one described in conjunction with FIG. 4. Adjustment may be performed here or in step 506, and on a column-by-column basis.

Image capture engine 34 may then apply this new gain level to each pixel of image data captured from one or more subsequent image frames. Alternatively, the new gain level may be represented as a gain factor. Depending on the gain factor used, adjustment may be performed by, for example, multiplying the gain factor by the captured image data. The desired pixel value may be a predetermined value, or an averaged value. For example, the desired pixel value may be an average of a plurality of reference and/or sensing detector values within a plurality of captured data columns in the x-direction.

Where a plurality of sensor stations are used, image data captured by each sensor station may be normalized independently. Such independent processing may be desirable, for example, where image capture engine 34 may utilize different parameters for each sensor station such as light sources using various wavelengths, and/or sensors with varying integration times. When a plurality of sensor stations are used, each representation of an image captured by a sensor station may be recombined and/or undergo other processing to form a single representation of the image.

Figure 4:
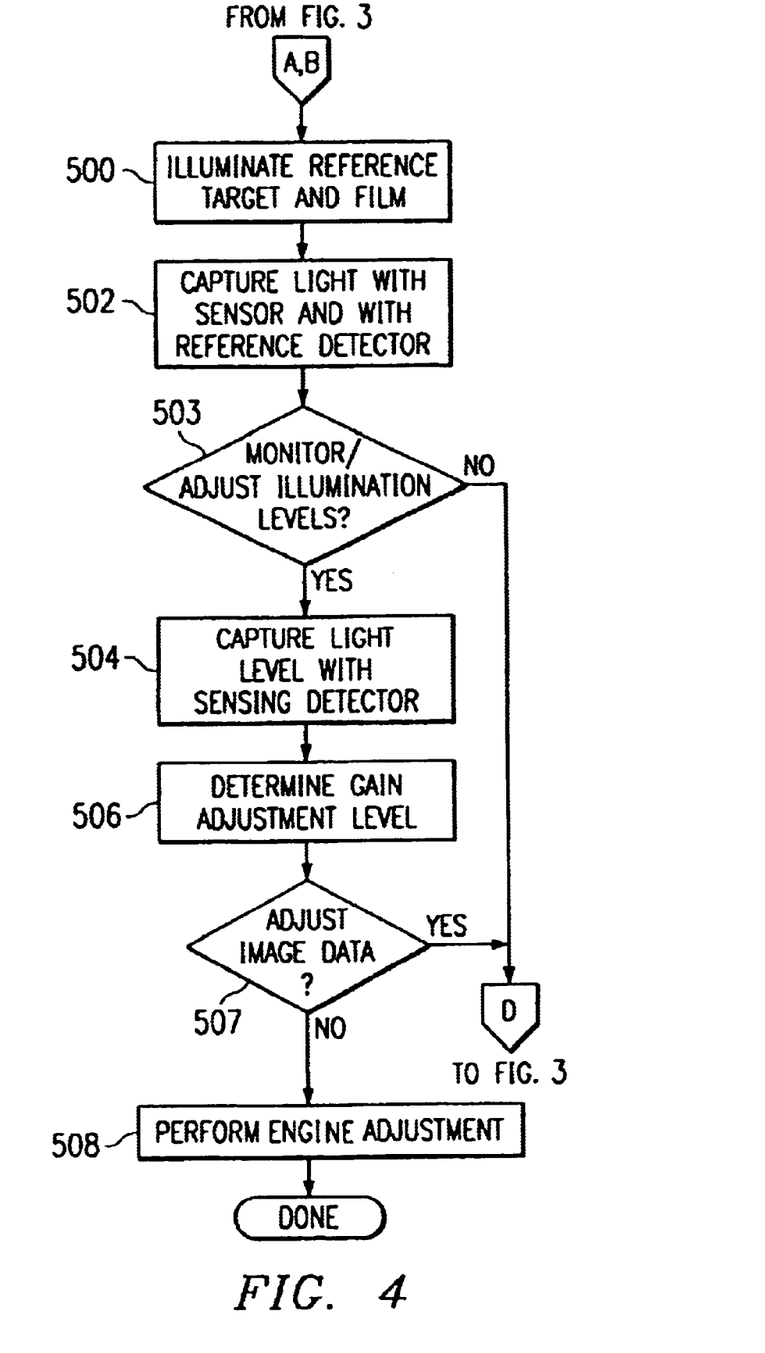
FIG. 4 illustrates an example of a method for monitoring and adjusting illumination of an image capture system utilizing the teachings of the present invention.

FIG. 4 illustrates an example of a method for monitoring and adjusting illumination of an image capture system utilizing the teachings of the present invention. While sensor station 40 is used to illustrate this aspect of the invention, the method discussed in conjunction with this FIG. 3 may be used with any number of sensor stations and/or views. Image capture engine 34 may also selectively perform the method using some or all of these sensor stations and/or views as desired. Although steps 500–508 are illustrated as separate steps, various steps may be ordered in other logical or functional configurations, or may comprise single steps.

Generally, image capture engine 34 uses a reference target 62 or 70 to monitor illumination levels as image data is obtained in the x direction continually or as desired. Image capture engine 34 may capture reference energy levels from reference detectors and/or sensed energy levels from one or more sensing detectors 61. Image data may be adjusted in response to these levels as they change between data columns. These adjustments may be desirable, because image capture engine 34 may, for example, maintain a stable input current to light source 50, the optical output power of light source 50 still typically drifts. In some embodiments of the invention, image capture engine 34 may adjust signal modulation by measuring one or more prior pulses of light source 50 and adjusting its signal modulation to a desirable level. This may desirably allow image capture engine 34 to operate independently of content and/or unexposed regions within film 60, and may also ensure that illumination is generally uniform or varies within a small range.

The method begins in step 500, where light source 50 illuminates film 60 and reference target 62 or 70 as illustrated in FIGS. 2A–2C. In step 502, image capture engine 34 may utilize sensor 52 to capture data from film 60, and one or more reference detectors to capture reference energy levels from reference target 62. Because reflective and transmissive properties of reference target 62 typically do not vary appreciably, image capture engine 34 may use data captured by each reference detector as a reference level. Image capture engine 34 may utilize this reference level to apply gain to subsequent latent image data captured to compensate for slight variations in illumination levels or drifts within the detectors. Such an advantage may minimize the presence of signal noise and may stabilize image capture engine 34 to the extent that detector response variations caused by spectral bandwidth shifts of illumination combined with detector responsivity are relatively constant as a function of wavelength.

In one embodiment of the invention, image capture engine 34 may average data captured by each plurality of reference detectors to estimate a drift in illumination. Alternatively or in addition, image capture engine 34 may also perform filtering of several prior estimates to correct for illuminator drift and its effects on image data in the x direction, as discussed earlier in conjunction with FIG. 3, at step 316. For example, image capture engine 34 may use a weighted average from prior data columns.

In step 503, image capture engine 34 may optionally determine whether to adjust signal modulation in steps 504–508. This may be desirable where signal modulation of light source 50 drifts within a tolerance that may be less than some noise threshold, such as total system noise, or desired noise floor, etc. For example, image capture engine 34 may determine these drifts from initial estimates and/or prior reference and/or sensed energy levels. In some applications, such as where drifts are larger than this tolerance, image capture engine 34 may adjust image data in step 316 as discussed previously. In steps 504–508, image capture engine 34 may optionally adjust light sensor 50 to output relatively uniform illumination levels within some tolerance before image capture engine 34 captures additional data.

In step 504, image capture engine 34 may capture the current illumination level of a light pulse using sensing detector 61 as a sensed energy level. For example, as a data column is captured, nominal energy levels for detectors within sensor 52 are typically modulated with detector variances. That is, although the energy level values may be the same, detector variances may not be separable from illumination variances. Thus, normalization of both detector variances within sensor 52 as well as illumination variances for light source 50 may be desirable. Image capture engine 34 may utilize and/or create one or more correction factors to correlate energy level values from each sensing detector 61 to those from light source 50. Image capture engine 34 may then utilize the sensor, camera and/or illumination drift data measured from the sensing detector 61 and/or reference detectors to adjust image data. Alternatively or in addition, image capture engine 34 may adjust sensor integration times, and/or light source amplitude or pulse width levels before the next pulse from light source 50 in response to this data.

In step 506, image capture engine 34 calculates the drift in the illumination level of this pulse from a prior light pulse level, and determines an appropriate gain that, if desired in step 507, may be used to adjust image data in step 316 as discussed previously.

Image capture engine 34 may then apply this new gain level to each pixel of image data captured from one or more subsequent data columns to correct for the drift in illumination. Alternatively, the new gain may be represented as a gain factor. Depending on the gain factor used, adjustment may be performed by, for example, multiplying the gain factor by the captured image data or logarithmically subtracting the gain factor from the captured image data. The new gain level may be calculated by a variety of known methods, using pixel values, illumination levels, or a combination thereof.

For example, image capture engine 34 may measure a desired light level as a pixel value of 2233 (where each pixel comprises twelve (12) bits of resolution). The desired pixel value may be a predetermined value, or an averaged value. The desired pixel value may be an average of all prior reference detector values measured in the x-direction. In some applications, the new gain level may be obtained by calculating the ratio of the desired value over the measured value. This gain is then multiplied by the actual measurement of each detector to produce a constant referenced value and normalize the entire column to the reference. Thus, where reference detectors measure a lower light level such as 2230, the new gain value will be 2233/2230. Similarly, where reference detectors measure a higher light level such as 2235, the new gain value will be 2233/2235.

In step 508, image capture engine 34 may utilize discrete feedback from one or more prior pulses to determine an operating point for a next pulse. In some applications, illumination control 43, processor 36, or a combination of the two, may be used to deliver an input signal to light source 50. Image capture engine 34 may desirably average measured illumination levels for prior pulses to establish a desired illumination level for the next pulse. Image capture engine 34 may utilize many types of averaging algorithms or filters, including but not limited to, weighted averages, and infinite or finite impulse response algorithms.

While the invention has been particularly shown by the foregoing detailed description, various changes, substitutions, and alterations may be readily ascertainable by those skilled in the art and may be made herein without departing from the spirit and scope of the present invention as defined by the following claims.

What is claimed is:

1. A signal modulation adjustment system comprising:
   a first light source;
   a first sensor operable to capture light reflected from film illuminated by the first light source;
   a reference sensor operable to capture light reflected from a reference target illuminated by the first light source; and
   processing circuitry coupled to the first sensor and operable to:
   capture image data from the film in response to a first amount of light reflected from the film with the first sensor for a first integration time; and capture a first reference output produced approximately simultaneously to the first amount of light reflected from the film in response to a first amount of light reflected from the reference target in a field of view of the reference sensor;
   wherein the processing circuitry is further operable to cause adjustment of a sensed output illumination level of the first light source in response to the first reference output before a next time interval; and
   wherein adjustment of the next sensed output illumination level of the light source comprises:
   production by a sensing detector of a first sensed output in response to a first amount of light illuminated by the light source, the sensing detector operable to determine a sensed illumination level of the light source during the first time interval;
   calculation of a relationship between the reference output and the sensed output; and
   adjustment of at least one of the group consisting of an integration time of the first sensor, an output signal amplitude of the first light source and an output signal pulse width of light of the first light source in response to the calculated relationship to provide a next output illumination level for the light source for the next time interval.

2. The system of claim 1, wherein the sensing detector is coupled to the light source.

3. The system of claim 1, wherein the processing circuitry is further operable to adjust the image data in response to the sensed output.

4. A signal modulation adjustment system comprising:
   a first light source;
   a first sensor operable to capture light reflected from film illuminated by the first light source;
   a reference sensor operable to capture light reflected from a reference target illuminated by the first light source; and
   processing circuitry coupled to the first sensor and operable to:
   capture image data from the film in response to a first amount of light reflected from the film with the first sensor for a first integration time; and
   capture a first reference output produced approximately simultaneously to the first amount of light reflected from the film in response to a first amount of light reflected from the reference target in a field of view of the reference sensor; wherein the processing circuitry is further operable to cause adjustment of a sensed output illumination level of the first light source in response to the first reference output before a next time interval; and
   wherein adjustment of the sensed illumination level comprises:
   production of a plurality of sensed outputs in response to a plurality of amounts of light illuminated by the light source by a sensing detector operable to determine a sensed illumination level of the light source during each of a plurality of time intervals;
   calculation of a relationship between the reference output and at least one of the plurality of sensed outputs; and adjustment of at least one of the group consisting of an integration time of the first sensor, an output signal amplitude of the first light source and an output signal pulse width of light of the first light source in response to the calculated relationship to provide a next output illumination level for the light source for the next time interval.

5. A signal modulation adjuster, comprising:

a computer readable medium; and illumination adjustment software on the computer readable medium, the illumination adjustment software being operable to:

capture image data from film in response to a first amount of light reflected from the film with a first sensor for a first integration time; and capture a first reference output produced approximately simultaneously to the first amount of light reflected from the film in response to a first amount of light reflected from a reference target in a field of view of a reference sensor; and wherein the software is further operable to cause adjustment of a sensed output illumination level of the first light source in response to the first reference output before a next time interval; and wherein adjustment of the next sensed output illumination level of the light source comprises:

production by a sensing detector of a first sensed output in response to a first amount of light illuminated by the light source, the sensing detector operable to determine a sensed illumination level of the light source during the first time interval;

calculation of a relationship between the reference output and the sensed output; and adjustment of at least one of the group consisting of an integration time of the first sensor, an output signal amplitude of the first light source and an output signal pulse width of light of the first light source in response to the calculated relationship to provide a next output illumination level for the light source for the next time interval.

6. The adjuster of claim 5, wherein the sensing detector is coupled to the light source.

7. The adjuster of claim 6, wherein adjustment further comprises correlation of the first sensed output and the first reference output with a selected correction factor.

8. The adjuster of claim 5, wherein the software is further operable to adjust the image data in response to the sensed output.

9. A signal modulation adjuster, comprising:

a computer readable medium; and illumination adjustment software on the computer readable medium, the illumination adjustment software being operable to:

capture image data from film in response to a first amount of light reflected from the film with a first sensor for a first integration time; and capture a first reference output produced approximately simultaneously to the first amount of light reflected from the film in response to a first amount of light reflected from a reference target in a field of view of a reference sensor, wherein adjustment of the sensed illumination level comprises:

production of a plurality of sensed outputs in response to a plurality of amounts of light illuminated by the light source by a sensing detector operable to determine a sensed illumination level of the light source during each of a plurality of time intervals;

calculation of a relationship between the reference output and at least one of the plurality of sensed outputs;

adjustment of at least one of the group consisting of an integration time of the first sensor, an output signal amplitude of the first light source and an output signal pulse width of light of the first light source in response to the calculated relationship to provide a next output illumination level for the light source for the next time interval.

10. The adjuster of claim 9, wherein the calculated relationship is at least one of the group consisting of an infinite impulse response, a finite impulse response, and a weighted average.

* * * * *